(No Model.)
W. B. PAGE & B. HAUSHEER.
FLUID HEATER.
No. 499,850. Patented June 20, 1893.
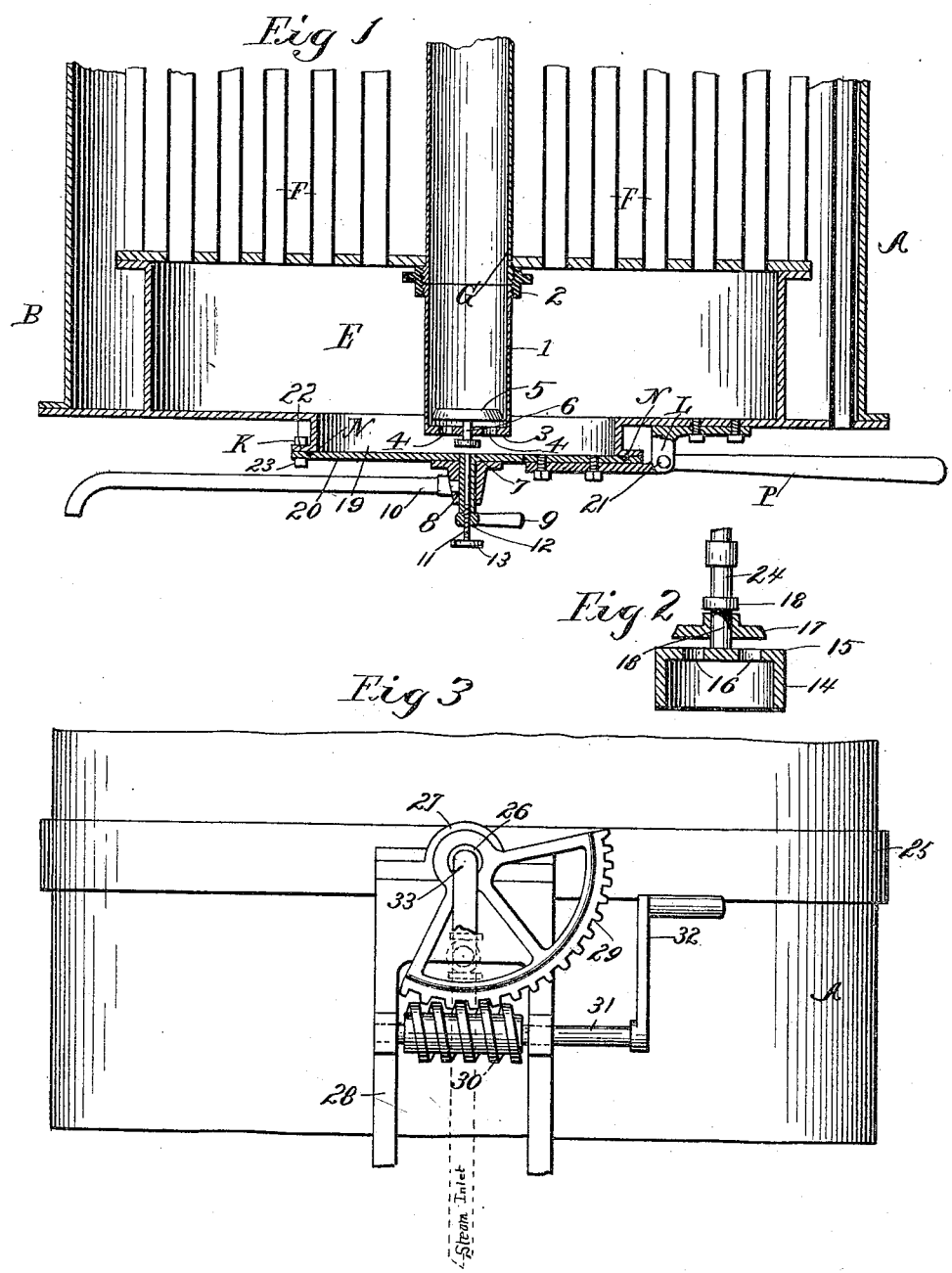
WITNESSES.
INVENTORS
William B. Page.
Bernhard Hausheer
per John G. Manahan
their ATTORNEY.

UNITED STATES PATENT OFFICE.

WILLIAM B. PAGE AND BERNHARD HAUSHEER, OF DIXON, ILLINOIS.

FLUID-HEATER.

SPECIFICATION forming part of Letters Patent No. 499,850, dated June 20, 1893.

Application filed February 4, 1893. Serial No. 461,018. (No model.)

*To all whom it may concern:*

Be it known that we, WILLIAM B. PAGE, a citizen of the United States, and BERNHARD HAUSHEER, a citizen of Switzerland, both residing at Dixon, in the county of Lee and State of Illinois, have invented certain new and useful Improvements in Milk and other Fluid Heaters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention has reference to heaters for milk and other fluids, and consists of certain improvements upon the structure invented by us for that purpose, and for which Letters Patent of the United States No. 454,948 were granted to us on June 30, 1891. As the general advantages and necessity for said machine as well as the method of its operation, so far as there shown and described, are fully stated in the specification of said Letters Patent, we do not deem it necessary to any further state the same in this application. Also, as the general construction and mode of operation of the present machine, so far as its parts correspond to those of said patented machine, is the same as therein shown and described, we do not consider it requisite to show or specially refer to those parts, which are common to both applications, but will restrict the description herein to the improvements claimed hereby, and the mode of their addition to, and general operation with, the aforesaid patented improvements. After our introduction of the machine shown in said Letters Patent, we experienced the necessity for, and advantage of, much larger machines than we intended to build at the time of the aforesaid application, and such larger sizes required additional conveniences for discharging the residuum of the milk, and for affording access to the lower general chamber, and the lower extremities of the vertical milk tubes, for cleaning and other purposes.

It is the design in the present construction to furnish the base of the heater with a central man-hole, adapted to admit a person within the lower general milk chamber for the purpose of cleaning the latter. Also to make provision for pumping any residuum of the milk up through the central tube G. Also to support and swing the milk receptacle on lateral trunnions, and provide mechanism for turning said receptacle into a horizontal position, so as to give more ready access to the lower extremities of the milk tubes, and to the general chamber with which said lower extremities communicate, and also to render feasible the employment of the machine in apartments the ceilings of which are too low to permit of seating said machine much above the floor.

These improvements are illustrated in the accompanying drawings, in which—

Figure 1 is a vertical central section of the lower portion of the heater which is constructed, as to its upper part, in substantial accord with the apparatus shown and described in our aforesaid Letters Patent. Fig. 2 is the lower end of the piston for pumping the residuum of milk through the center tube G. Fig. 3 is an illustration of a toothed segment rigidly seated on one of the trunnions of the receptacle, and an axle provided with a worm gear for engaging the same, to partially rotate said receptacle from a vertical to a horizontal position, and hold the latter at any desired inclination.

Similar letters and figures refer to similar parts throughout the different views.

Referring to Fig. 1, A is the lower portion of the external case, or water chamber, shown in said patent.

B is the overflow water exit shown therein, and F—F are the series of vertical milk tubes shown in said patent, having communication at their upper ends with the common chamber D of said earlier patent (not shown here), and having communication at their bases with the common chamber E of said earlier patent.

G is the central milk feed tube shown in said patent. In this application there is provided, at the lower end of said tube G, a supplemental cylindrical extension 1, removably connected with the normal lower extremity of tube G by means of a collar 2, having threaded inner walls adapted to be screwed upon conforming threads on the exterior of the lower end of the tube G and the upper end of the extension 1. The said extension 1 extends to nearly the bottom of the chamber E and has a closed end 3, provided with vertical openings 4 therein. An automatic valve 5 is seated on the upper surface of the bottom 3, by means of a central stem 6 passed loosely down through the center of said bottom.

Directly beneath the stem 6 there is formed an opening 7 in the bottom of the chamber 3, within which is vertically seated from beneath a faucet 8 having the usual handle 9, and communicating laterally, in the usual mode, with the horizontal exit tube 10. A short shaft 11 is projected upward through the faucet 8 in such position that its upper end abuts against the lower end of the stem 6. The shaft 11 is threaded in its lower portion, and works in a conforming nut 12 seated in the lower end of the faucet, and is provided at its lower end with the thumb-piece 13, by means of which the shaft 11 is optionally screwed up against the lower end of valve stem 6 to hold the valve 5 above the base 3, and permit the milk to flow through openings 4 into chamber E in the normal use of the apparatus. But when it is intended to pump the residuum of milk up through the tube G, the shaft 11 is withdrawn from engagement with stem 6, when valve 5 rests upon its seat 3, and, when the piston 24, shown in Fig. 2, is inserted in tube G, its downward movement and the gravity of valve 5 forces the latter down upon its seat 3. When said piston is lifted the valve 5 rises sufficiently to uncover the openings 4 and permit the milk in the chamber E, and that which flows into said chamber from the pipes F, to pass into tube G and to be pumped upward through the openings 4 and tube G. Said piston 24 is furnished with a cylinder 14, at its lower end, having a lower open extremity, and its upper end forming a valve seat 15 with the milk openings 16 therein. A loose valve 17, collared on the piston rod 18, automatically closes the opening 16 when said piston is raised, and opens the same when said piston is lowered.

In the base of chamber E there is centrally formed a man-hole opening 19, to optionally close which there is provided the man-hole plate 20 rigidly attached to a transverse rod 21 suitably journaled in a sleeve L, which latter is fastened to the base of chamber A, said rod 21 being provided with lever P rigidly attached at its inner end to said rod as a means of opening and closing said man-hole. The weight of said lever tends to hold plate 20 up in place. In the upper surface of plate 20, and where said plate extends over the margin of the opening 19, there is formed an annular recess N, to receive suitable packing to prevent leakage. One or more bolts K, seated in an exterior flange 22, formed around the opening 19, and provided with nuts 23, afford means of sealing the plate 20 over the opening 19.

By the above provisions, where the ceiling is of sufficient height to admit of the insertion and operation of the piston 24 within the tube G, the residuum of milk aforesaid can be drawn up through said tube G. But where the ceiling is not of sufficient height to permit that method of extracting said residuum, the latter may be drawn off through the openings 7 and tube 10 by means of faucet 8.

Referring to Fig. 3, a band 25 is rigidly seated around the exterior of the chamber A, about two-fifths of the distance from its base, on which there is formed on opposite sides the trunnions 26 integral with said band, or rigidly connected thereto through one of which trunnions the steam inlet 33, passes. The trunnions 26 are seated in boxes 27, suitably supported upon legs 28. A toothed segment 29 is rigidly keyed on the trunnions 26, and adapted to be engaged and operated by a worm 30, formed on an axle 31, suitably journaled on the legs 28, and provided with an operating crank 32. The trunnion 26 extends sufficiently beyond the surface of the chamber A to give room for the rotation of the crank 32. By the rotation of the worm 30, partial rotation is imparted to the trunnions 26, through the medium of segment 29, and the chamber A turned into the horizontal position, whereby ready access is afforded to the chamber E through the man-hole 19 therein. For convenience of access to the chamber E and the communicating tubes F, the extension 1 containing valve 5 can be temporarily removed, by simply unscrewing the collar 2, when the whole area of chamber E is free of obstruction. The worm 30, serves also as a lock against casual rotation of chamber A.

What we claim as our invention, and desire to secure by Letters Patent of the United States, is—

1. The combination, with a case provided with a chamber at its lower end and having an opening leading thereto, of a covering for the opening, a central feed tube and a series of smaller tubes, each communicating with the chamber, a removable collar upon the lower end of the feed tube, an extension removably secured to the collar, the lower end of which is closed and provided with openings, an automatic valve upon the interior of the extension for closing the openings therein, and means for opening the valve, substantially as set forth.

2. The combination with a case provided with a chamber at its lower end and provided with an opening leading thereto, of a feed tube, and a series of smaller tubes, each communicating with the chamber, a removable extension secured to the lower end of the feed tube, the lower end of which extension is provided with a valve, a covering for the opening in the case, and means for opening said valve, substantially as set forth.

3. The combination of the extension 1, valve 5 seated in the interior thereof, and provided with stem 6, nut 12 seated in the faucet 8, and a removable rod 11 provided with exterior threads adapted to engage said nut, whereby valve 5 is sustained at any desired altitude for the normal circulation of the milk, or other fluid, through the lower end of extension 1; substantially as shown, and for the purpose described.

4. The combination, with a case provided with a chamber at its lower end, and having an opening leading thereinto, of a series of tubes communicating with said chamber, one of which is provided with a removable extension, and a counter balanced cover for the opening secured at one side thereof, substantially as set forth.

In testimony whereof we affix our signatures in presence of two witnesses.

WILLIAM B. PAGE.
BERNHARD HAUSHEER.

Witnesses:
ALBERT R. ASHLEY,
WILLIAM McBRIDE.